United States Patent [19]
Lau et al.

[11] Patent Number: 6,009,468
[45] Date of Patent: Dec. 28, 1999

[54] EMPLOYING FEEDBACK DATA AND CONGESTION RANKING TO MINIMIZE CONTENTION DELAY IN A MULTI-SLOT MAC PROTOCOL

[75] Inventors: Gustavo Lau, Fremont; Zaheer Ahmed; Hojat Khelghatti, both of San Jose, all of Calif.

[73] Assignee: Ericsson, Inc., Menlo Park, Calif.

[21] Appl. No.: 08/885,618

[22] Filed: Jun. 30, 1997

[51] Int. Cl.⁶ .......................... G06F 13/14; H04L 12/413
[52] U.S. Cl. .......................... 709/225; 709/253; 370/444
[58] Field of Search .................... 370/443, 444, 370/447; 395/200.55, 200.65, 200.83; 709/225, 235, 253

[56] References Cited

U.S. PATENT DOCUMENTS

| | | | |
|---|---|---|---|
| 4,663,757 | 5/1987 | Huang et al. | 370/85 |
| 4,910,732 | 3/1990 | Schwarz | 370/85.1 |
| 5,297,144 | 3/1994 | Gilbert et al. | 370/95.2 |
| 5,299,198 | 3/1994 | Kay et al. | 370/95.3 |
| 5,319,641 | 6/1994 | Fridrich et al. | 370/85.3 |
| 5,390,181 | 2/1995 | Campbell et al. | 370/85.2 |
| 5,402,422 | 3/1995 | Liu et al. | 370/85.5 |
| 5,844,906 | 12/1998 | Khelghatti et al. | 370/474 |

FOREIGN PATENT DOCUMENTS 07107026   4/1995   Japan .

OTHER PUBLICATIONS

Dail, J. E., et al: "Adaptive Digital Access Protocol: A MAC Protocol for Multiservice Broadband Access Network", IEEE Communications Magazine, vol. 34, No. 3, Mar. 1, 1996, pp. 104–112, XP000557382, see p. 140, left–hand col., ¶ 1–p. 109, left–hand column, ¶3.

Bisdikian, C., et al: "MS START: A Random Access Algorithm for the IEEE 802.14 HFC Network", Computer Communications, vol. 19, No. 11, Sep. 1996, pp. 876–887, XP000635574, see abstract, see p. 876, left–hand col., ¶ 1–p. 879, right–hand col., ¶ 7.

Bisdikian, Chatschik, *A Review of Random Access Algorithms*, IEEE Project 802.14 Working Group, Jan. 1996.

*Primary Examiner*—Mark H. Rinehart
*Attorney, Agent, or Firm*—Lyon & Lyon LLP

[57] ABSTRACT

An exemplary point-to-multipoint network including an upstream headend facility and a plurality of downstream network terminals ("NTs") employs a contention-based multi-slot MAC permit protocol for upstream request transmission, wherein each NT compiles a congestion rank for each upstream slot position based on feedback information supplied by the headend. At such time as an NT wishes to attempt an upstream response to an multi-slot permit, it excludes the slot position having the highest rank for purposes of selecting an upstream response slot, and chooses among the others at random. If there are two or more slots having an equally high rank, the NT still excludes only one of the slots, based on a predetermined order of priority calculated at random from the NT's unique physical ID. If an NT is not successful with its initial response in the selected slot position, it will randomly select a waiting period of zero, one or two multi-slot permit cycles before attempting another upstream transmission. If, before attempting a re-transmission, the NT observes an intervening collision between two or more other NTs in the same upstream response slot, it will increase its waiting period by yet another two permit cycles.

15 Claims, 3 Drawing Sheets

COLLISION FEEDBACK KEY:
01 = COLLISION
10 = SUCCESSFUL TRANSMISSION
00 = NO TRANSMISSION ATTEMPT
         MADE

COLLISION FEEDBACK (32)

| SLOT # | 1 | 2 | 3 | 4 | 5 | 6 |
|---|---|---|---|---|---|---|
| t = 1 | X | C | T | C | X | X |
| 2 | C | C | X | X | T | C |
| 3 | C | C | C | T | C | T |
| 4 | X | X | C | T | C | X |
| 5 | T | T | C | C | C | X |
| 6 | X | T | X | C | X | C |
| 7 | C | C | T | C | T | X |

CUMULATIVE FEEDBACK (34)

| SLOT # | 1 | 2 | 3 | 4 | 5 | 6 |
|---|---|---|---|---|---|---|
| t = 1 | 0 | 0 | 0 | 0 | 0 | 0 |
| 2 | 0 | 3 | 0 | 3 | 0 | 0 |
| 3 | 3 | 5 | 0 | 2 | 0 | 3 |
| 4 | 5 | 7 | 3 | 1 | 3 | 2 |
| 5 | 4 | 6 | 5 | 0 | 5 | 1 |
| 6 | 3 | 5 | 7 | 3 | 7 | 0 |
| 7 | 2 | 4 | 6 | 5 | 6 | 3 |
| 8 | 4 | 6 | 5 | 7 | 5 | 2 |

Fig. 5 t=n

| SLOT# 1 | 2 | 3 | 4 | 5 | 6 | RE-TRANSMISSION RANK: |
|---|---|---|---|---|---|---|
|  |  |  |  |  |  | 4 |
|  | 39, 21 |  |  |  |  | 3 |
| 18 |  | 26 | 52 |  | 6 | 2 |
| 25 |  | 13 | 2 |  |  | 1 |
| 12 |  | 9, 7 |  | 36, 17 | 54 | 0 (TRANSMISSION) |

Fig. 6 t=n+1

| SLOT# 1 | 2 | 3 | 4 | 5 | 6 | RE-TRANSMISSION RANK: |
|---|---|---|---|---|---|---|
|  |  | 26 |  |  |  | 4 |
|  |  | 13 |  |  |  | 3 |
|  | 39, 21 | 9 |  | 36 |  | 2 |
| 18 |  |  | 52 | 17 | 6 | 1 |
| 25 |  | 7 | 2 |  |  | 0 (TRANSMISSION) | ns
EMPLOYING FEEDBACK DATA AND CONGESTION RANKING TO MINIMIZE CONTENTION DELAY IN A MULTI-SLOT MAC PROTOCOL

FIELD OF THE INVENTION

The present invention pertains to the field of communication networks, including apparatus and data transmission protocols for the transport of digital data over a shared point-to-multipoint broadband access network.

BACKGROUND OF THE INVENTION

Much activity is presently being directed into the design and deployment of "point-to-multipoint" broadband access networks, wherein downstream signals are broadcast from a single head-end facility to multiple end user stations (i.e., via "point-to-multipoint" transmission), and upstream signals are transmitted from each respective end users to the head end facility (i.e., via "point-to-point" transmission), respectively. It presently anticipated that point-to-multipoint broadband access networks will be employed to support a variety of independent communication services, such as, e.g., traditional two-way telecommunications, broadcast video (i.e., CATV) services and a full range of digital baseband services.

Given the wide variety of potential communication services to be supported over point-to-multipoint network broadband access networks, it is desirable to provide efficient digital data transmission protocols for supporting both the downstream and upstream communication paths. Notably, such networks are well suited to support asynchronous transfer mode ("ATM") based data transmission, whereby data packets or "cells" are periodically assembled and transmitted from a sending node, and received and disassembled at a receiving node.

In particular, ATM transmission enables the transmission of multiple services over a single communication path, whereby individual service bandwidth utilization may be optimized as a function of the statistical activity of each individual service—i.e., wherein the services are "bursty" in nature, so that bandwidth is efficiently shared.

For example, bursty data traffic may include local area network ("LAN") traffic, which is traditionally limited to private, or closed-loop networks, but may be more frequently carried over shared public access (e.g., telecommunication) networks for greater efficiency in connecting multiple LAN locations. Further, with the explosion of recent interest in services associated with the "Internet", demand for low cost, high speed two-way digital data transport is at an all time high.

By way of specific example, network architectures and data communication protocols for supporting both downstream and upstream transport of ATM-based digital data over a point-to-multipoint network comprising a headend facility connected to multiple downstream network terminals ("NTs") via a shared coaxial distribution network are disclosed and described in U.S. patent application Ser. No. 08/772,088, filed Dec. 19, 1996, entitled "Network Architecture for Broadband Data Communication Over a Shared Medium" (hereinafter referred to as "the '088 application"), which is fully incorporated herein by reference.

As described therein, downstream data is transmitted point-to-multipoint over the coaxial distribution network in continuous serial data frames over a common RF carrier frequency, whereby all downstream data frames are received by all NTs associated with the respective downstream RF carrier channel. The NTs evaluate each downstream data frame based on, e.g., destination or broadcast address fields, to determine whether it is an intended recipient of data contained therein. Upstream data is transported point-to-point in respective time-divided data slots from individual NTs to the headend in over a shared upstream RF carrier channel, whereby the upstream slots form successive upstream data frames at the headend.

In order to control upstream transmission, the headend allocates upstream "bandwidth" (i.e., upstream transmission slots) to respective NTs based on a selected set of operating criteria and service type priorities. To this end, each downstream data frame includes an upstream bandwidth "permit" transmitted as part of a media access control ("MAC") level protocol that, depending on the type of permit issued in a given downstream frame, allows for one or more respective NTs to transmit a specified response in a corresponding upstream slot.

Generally, permits are issued by the headend on either a "reserved" basis, i.e., wherein an upstream response is allowed only by a specified NT, or a "contention" basis, i.e., wherein one or more NTs may attempt a response in a single upstream slot. As will be apparent to those skilled in the art, there are three possible outcomes in the later case: (1) only a single NT will respond to the contention permit and will, thus, be successful; (2) two or more NTs will attempt to respond to the contention permit, thereby causing a collision in the designated upstream slot, with neither NT's response being successful; or (3) no NT will attempt a response.

In an effort to allow for a greater number of upstream bandwidth requests from the various NTs to reach the headend, the headend will periodically issue a "multi-slot" contention permit, wherein a single downstream permit allows a response (albeit substantially shortened) in any one of several successive "mini" upstream response slots. Of course, the possible outcomes are the same for any one of the slot positions as they are when only a single slot is available, i.e.: (1) only a single NT will respond in a given slot position and will be successful; (2) two or more NTs will attempt to respond in the same slot position, thereby causing a collision; or (3) no NT will attempt a response in a particular slot position.

The respective unsuccessful NTs will normally re-attempt an upstream response to the next multi-slot contention permit. In accordance with known practices, if an NT is not successful with its initial response in the selected slot position, it will keep with that slot position for attempting a response to each successive multi-slot permit, until such time as it successfully transmits a response. Thus, in order to minimize the chance for further collisions by NTs vying for the same slot position, a "re-transmission" protocol is preferably employed. For example, as taught in the '088 application, known contention resolution random access algorithms (RAAs) are employed, such as the Ternary Tree Binary Feedback (TTBF) algorithm, whereby respective NTs are assigned differing priority numbers for re-attempting transmission after a collision.

However, the aforedescribed algorithm is problematic, in that it does not successfully address situations where a majority of NTs happen to randomly select, and repeatedly vie for, only a few of the upstream slot positions, thus greatly decreasing the transmission success rate in those particular slot positions, while possibly leaving the remaining slot positions under-utilized.

SUMMARY OF THE INVENTION

The present invention provides improved contention resolution protocols for use in a point-to-multipoint broadband access network, wherein multiple NTs are attempting to transmit an upstream response to a multi-slot contention permit in a limited amount of responsive upstream slot positions, thereby improving the overall upstream slot bandwidth utilization.

In an exemplary point-to-multipoint broadband access network comprising an upstream headend facility and a plurality of downstream NTs, as each NT is first initialized on the network, it immediately begins tracking the result for each upstream slot position following a multi-slot contention permit issued by the headend. In particular, based on feedback information supplied by the headend, each NT monitors whether, for each upstream slot position, there was (1) a successful transmission, (2) a collision between two or more NTs, or (3) no transmission attempted. The results are tallied on a cumulative basis by each NT, such that each NT thereby maintains an ongoing "congestion ranking" for each upstream slot position.

At such time as an NT wishes to attempt an upstream response to an multi-slot permit, it excludes the slot position having the highest rank for purposes of selecting an upstream response slot, and chooses among the others at random. If there are two or more slots having an equally high rank, the NT still excludes only one of the slots, based on a predetermined order of priority calculated at random from the NT's unique physical ID.

If an NT is not successful with its initial response in the selected slot position, it will keep that same slot position for further response attempts, until it is successful. In particular, once an NT determines that its initial response was not successful, it will randomly select a waiting period of zero, one or two multi-slot permit cycles before attempting another upstream transmission. If, before attempting a re-transmission, the NT observes an intervening collision between two or more other NTs in the same upstream response slot, it will increase its waiting period by yet another two permit cycles.

Other and further objects, features, aspects and advantages of the present invention will become better understood with the following detailed description of the accompanying drawings.

BRIEF DESCRIPTION OF THE INVENTION

The drawings illustrate both the design and utility of preferred embodiments of the present invention, in which:

FIG. 5 illustrates a ranking of NTs awaiting a re-transmission attempt on their respective selected upstream slots at time t=n; and FIG. 6 illustrates a ranking of NTs awaiting a re-transmission attempt on their respective selected upstream slots at time t=n+1.

DETAILED DESCRIPTION OF THE DRAWINGS

Figure 1:
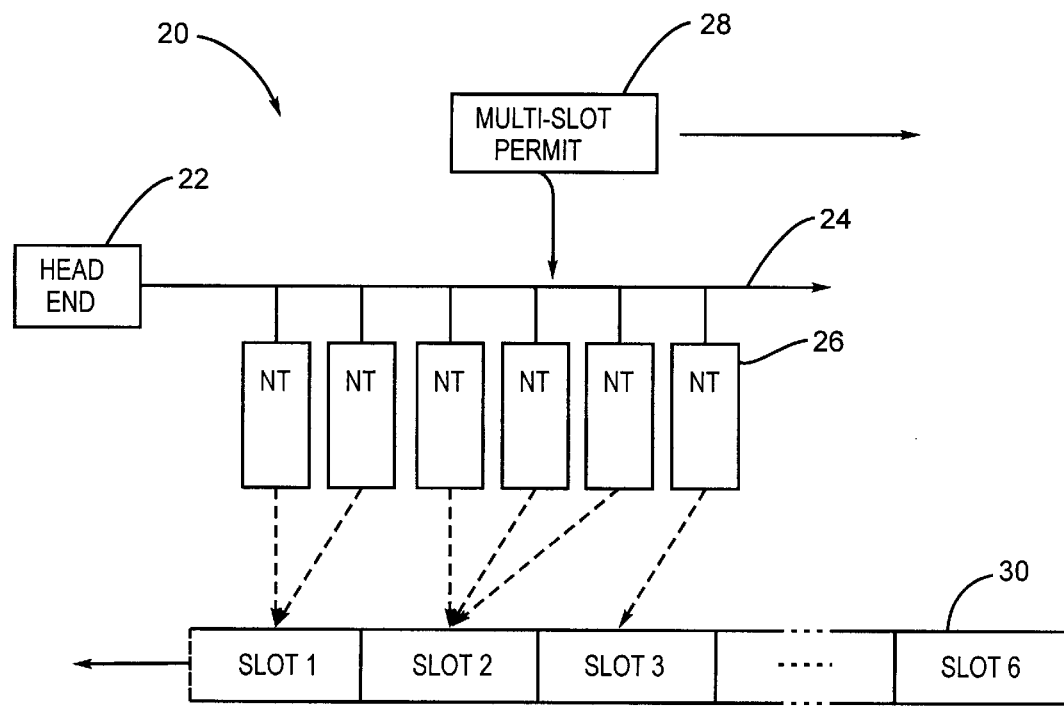
FIG. 1 is a block diagram of a contention-based multi-slot MAC protocol employed in an exemplary point-to-multipoint broadband access network.

Referring to FIG. 1, an exemplary broadband access network 20 includes a headend 22, which transmits downstream data frames point-to-multipoint via a distribution network 24 to a plurality of NTs 26. In the other direction, the NTs 26 transmit upstream data slots point-to-point to the headend 22 over the same network 24. A more detailed description of an exemplary preferred protocol for the two-way transmission of data over network 20 is provided in the above-incorporated '088 application.

In accordance with this exemplary transmission protocol, the headend 22 periodically transmits a multi-slot contention permit 28, that allows each NT 26, (or a selected group thereof, if a "group" address is used), to attempt a response back to the headend 22 in any one of up to six serial upstream data slots 30. As was discussed above, however, two or more NTs 26 cannot successfully transmit to the headend 22 in the same upstream slot (30). Thus, if two (or more) NTs 26 attempt a response to the multi-slot contention permit 28 in the same slot (30), a collision will occur and neither of the attempted transmissions will be successful.

By way of the example illustrated in FIG. 1, upstream data slots 1 and 2 each have multiple NTs 26 attempting a responsive transmission therein. Thus, no transmission will be successfully received by the headend 22 in either these slots. Slot 3, on the other hand, has only a single NT 26 attempting a response, which will be successfully received at the headend 22. Finally, no NT 26 has attempted to transmit a response in slot 6.

Figure 2:
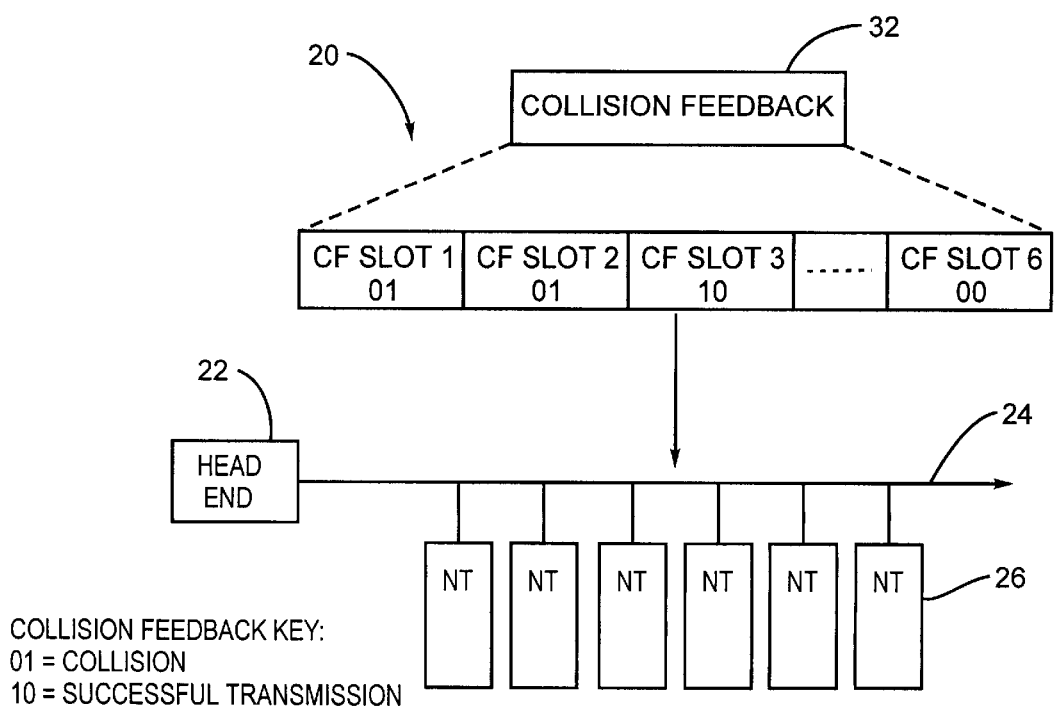
FIG. 2 is a block diagram of collision feedback information supplied by the headend to the network terminals ("NTs") in the broadband access network of FIG. 1, following a multi-slot permit and response interval.

Referring to FIG. 2, following the transmission of each multi-slot permit 28, the headend 22 transmits collision feedback information 32 in an ensuing downstream data frame that is monitored by each of the NTs 26. In a preferred embodiment, a two bit binary data field is used for each of the upstream data slots 1–6 to indicate whether an upstream transmission from an NT was successfully received at the headend 22. In particular, "01" is used to indicate that there was a collision, "10" is used to indicate there was a successful transmission, and "00" is used to indicate that there was no transmission attempt made.

Thus, based on the transmission attempts illustrated in FIG. 1, the collision feedback field for slots 1 and 2 will show "01", the collision feedback field for slot 3 will show "10", and the collision feedback field for slot 6 will show "00", respectively, in the ensuing collision feedback information 32 transmitted from the headend 22.

In accordance with a general aspect of the present invention, in addition to being able to determine whether its own transmission (if any) was successful received at the headend 22, each NT 26 can also monitor the result in each of the upstream data slots 1–6, to thereby track the relative congestion of each slot on an ongoing basis. In particular, from the moment it is initialized in the network 20, each NT 26 is configured to continually monitor the collision feedback information 32 transmitted by the headend 22 for purposes of maintaining a cumulative congestion ranking of each of the respective upstream transmission slots 1–6.

Figures 3, 4:
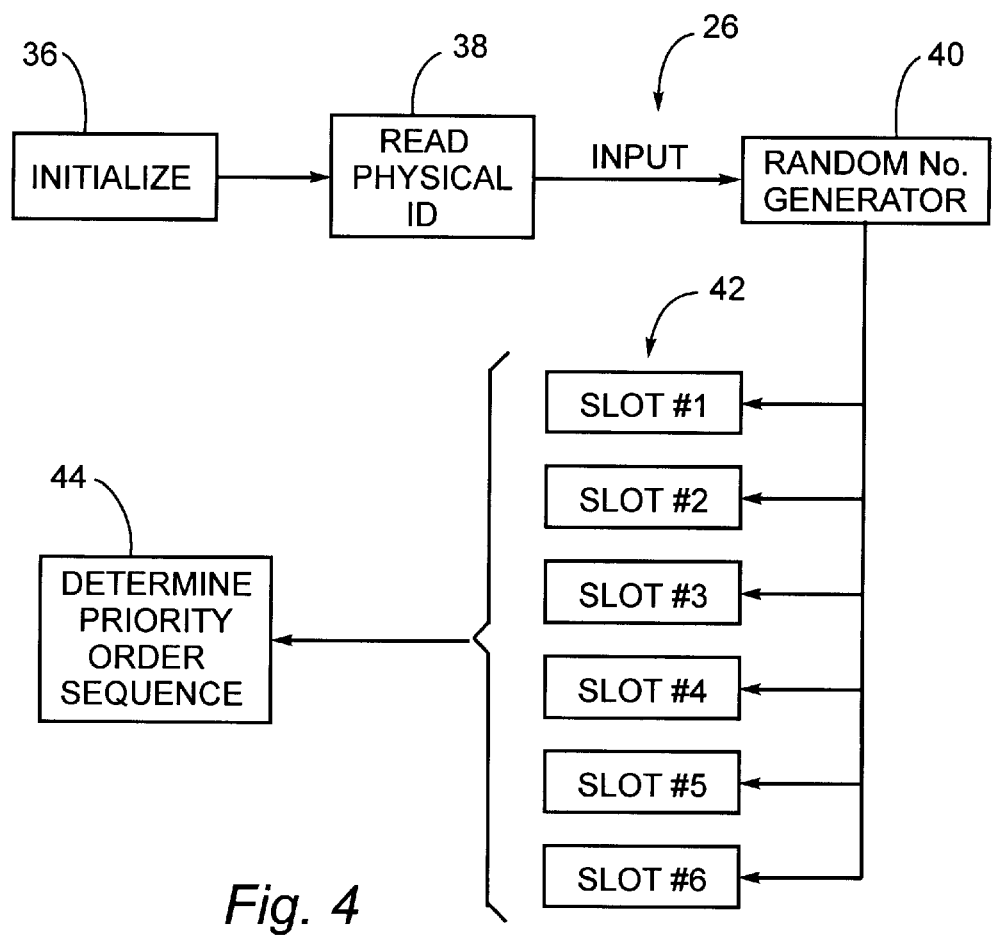
FIG. 3 illustrates an ongoing congestion ranking process performed by an exemplary NT based on collision feedback information supplied by a headend employing a six upstream slot configuration for response to each multi-slot permit.
FIG. 4 is a flow chart depicting a series of steps taken by an exemplary NT upon its system initialization to generate a slot priority sequence.

By way of example as illustrated in FIG. 3, an exemplary NT 26 is presumed to have been initialized on the network 20 at time t=0. At that time, the NT 26 sets its internal "rank" of each of the upstream response slots 1–6 to zero. Thereafter, the NT 26 adjusts its rank for each slot according to the following rules: upon the occurrence of a collision in a slot having a rank of zero, the rank of that slot is increased by three. For a collision in a slot having a non-zero rank, the rank of that slot is increased by two. For either a successful transmission or a "no transmission" in a respective slot, its rank is decreased by one. Notably, however, there can be no "negative" rank.

At time t=1, collision feedback data (32) representing the results of a previous multi-slot contention permit (28) is transmitted downstream by the headend (22). In this instance, a collision is indicated in slots 2 and 4; a successful transmission is indicated in slot 3; and a "no transmission" is indicated in slots 1, 5 and 6. Upon receiving this information, the NT 26 accordingly adjusts its slot ranking as follows: Slots 2 and 4 are incremented to three. The rank of all other slots remains at zero.

At time t=2, an ensuing transmission of collision feedback information (32) is transmitted downstream by the headend (22). In this instance, a collision is indicated in slots 1, 2 and 6; a successful transmission is indicated in slot 5; and a "no transmission" is indicated in slots 3 and 4. Upon receiving this information, the NT 26 adjusts its slot ranking as follows: Slots 1 and 6 are incremented by three; slot 2 is incremented by two (for a total of five); slot 4 is decremented by one (for a total of two); and slots 3 and 5 remain at zero.

The NT 26 continues this upstream slot rank increment/decrement process an ongoing basis until it logs-off the network 20.

Referring generally to all of the figures, at such time as an NT 26 wishes to transmit an upstream response to an multi-slot permit (28), it must first select an upstream slot position. In accordance with a more specific aspect of the invention, when making its upstream slot selection, the NT 26 excludes the respective slot 1–6 having the highest rank, randomly choosing a slot from among the remaining five. Notably, if two or more slots have an equally high rank, the NT 26 still excludes only one of the slots, based on a predetermined order calculated at random from the NT's unique physical ID.

More particularly, referring to FIG. 4, at the time an NT 26 is first initialized (i.e., "powered up") 36, it reads its own unique physical ID 38, which is typically in the form of a thirty-two bit binary representation of a decimal number assigned to the NT device 26 during its manufacture. The NT 26 then inputs its physical ID as a "seed" number into a random number generator 40 contain within the NT 26, which generates six different random numbers. As the numbers are output by the random number generator, the NT 26 associates each number with one of the six upstream response slots 1–6 used for responding to a multi-slot permit (28).

Once a random "priority number" 42 is generated for each of the six upstream response slots (30), the NT 26 determines a slot priority sequence list 44 by sorting the six slots (30) according to ascending values of their associated priority numbers 42. In this manner, each NT 26 creates its own random sequence order 44 for evaluating the respective rank of the upstream response slots 1–6 for the purposes of determining which slot has the "highest" rank.

In order to determine which slot has the highest rank for purposes of excluding that slot from the others when selecting an upstream transmission slot, an NT 26 starts with the first slot (1–6) in its own priority sequence list 44 as having the "highest" rank, and then compares the rank of that slot with the rank of each other slot in the generated sequence 44. A slot having the same, or higher rank as the current "highest ranking" slot is then selected over the previous slot, until the rank of all six slots have been compared. The highest ranking slot at the end of the comparison process is excluded from being a possible choice for the NT's upstream transmission slot, with one of the other five slots then being selected at random.

As will be apparent to those skilled in the art, in the instance where one or more slots have an equally high rank, the excluded slot will be determined strictly as a result of the priority sequence list 44 generated by the random number generator 40 at the time the NT 26 is initialized. By way of example, if an exemplary NT 26 having the illustrated the cumulative ranking 34 depicted in FIG. 3 had a randomly generated priority sequence list 44 of: {3,5,1,6,2,4}, at time t=4, slot 2 would be excluded; at time t=6, slot 5 would be excluded, and at time t=8, slot 4 would be excluded.

Of course, many variations in the selection process rules are possible while remaining within the inventive concepts presented herein. For example, instead of following a "greater than or equal to" rule for determining the slot with the highest rank, a strict "greater than" rule could be applied.

If an NT 26 is not successful with its initial response to a multi-slot permit (28), it will keep the same selected slot position for further response attempts, until it is successful. In particular, once an NT 26 determines that its initial response was not successful, it will randomly select a waiting period of zero, one or two multi-slot permit cycles before attempting another upstream transmission. If, before attempting a re-transmission, the NT observes an intervening collision between two or more other NTs in the same upstream response slot, it will increase its waiting period by yet another two permit cycles.

By way of illustration, FIG. 5 illustrates a "transmission" ranking of NTs 26 awaiting a further attempt to transmit a response to a multi-slot contention permit (28) in their selected upstream slot at a given time t=n. In particular, in slot 1, NT#12 is waiting to transmit in the immediate transmission period (i.e., transmission rank=0), NT#25 waiting for the next transmission period (i.e., transmission rank=1), and NT#18 is waiting for the still further time period (i.e., transmission rank=2). With respect to the remaining slots: in slot 2, NT#21 and NT#39 are both at transmission rank=3; in slot 3, NT#7 and NT#9 are both at transmission rank=0, NT#13 is at transmission rank=1, and NT#26 is at transmission rank=2; in slot 4, NT#2 is at transmission rank=1, and NT#52 is at transmission rank=2; in slot 5, NT#17 and NT#36 are both at transmission rank=0; and in slot 6, NT#54 is at transmission rank=0, and NT#6 is at transmission rank=2.

As shown in FIG. 6, at time t=n+1, the following will occur:

In slot 1, NT#12 successfully transmitted its response, with NT#25 and NT#18 each moving up one transmission rank.

In slot 2, NT#39 and NT#21 both move up to transmission rank=2.

In slot 3, NT#7 and NT#9 collided, resulting in an unsuccessful transmission for both, with NT#7 randomly choosing a new transmission rank=0, and NT#9 randomly choosing a new transmission rank=2. NT#13 and NT#26 each observed this collision, and each moved back two respective transmission ranks.

In slot 4, NT#2 and NT#52 will each move up one respective transmission rank.

In slot 5, NT#36 and NT#17 collided, resulting in an unsuccessful transmission for both, with NT#17 randomly choosing a new transmission rank=1, and NT#36 randomly choosing a new transmission rank=2.

In slot 6, NT#54 successfully transmitted its response, with NT#6 moving up one transmission rank.

As will be appreciated by those skilled in the art, an advantage of the present invention is that, over time, the congestion ranking of each slot position will tend to equalize, as will the relative slot congestion rankings maintained by different NTs. Upstream bandwidth loss due to repeated collisions will be minimized on a network level, since each NT avoids what it determines as the most congested slot for attempting its transmission. Further, because each NT maintains a separate congestion ranking of each slot and priority order for resolving ties, different NTs will tend to exclude different, but still relatively congested, upstream response slots when making its selection.

While embodiments and applications of a preferred contention resolution protocols for use in a point-to-multipoint broadband access network employing a multi-slot contention permit protocol have been shown and described, as would be apparent to those skilled in the art, many modifications and applications are possible without departing from the inventive concepts herein.

Thus, the scope of the disclosed inventions is not to be restricted except in the spirit of the appended claims.

What is claimed:

1. In a communication network comprising a headend and a plurality of network terminals in communication with the headend over a shared communication medium, wherein the headend periodically transmits a multi-slot upstream transmission permit to the network terminals authorizing any one of a specified group of network terminals to transmit a response to the headend in any one of a preset number of corresponding upstream slots, and wherein the headend transmits feedback information to the network terminals following each multi-slot upstream transmission permit, the feedback information containing for each respective upstream slot an indication as to whether a transmission was attempted by any network terminal in response to the respective permit and, if so, whether the transmission was successfully received by the headend, a method for a respective network terminal to select a respective upstream slot for transmitting a response to a multi-slot upstream transmission permit, comprising the steps of:

compiling an ongoing rank for each respective upstream slot based on the feedback information transmitted by the headend; and excluding as a possible upstream slot that slot having a highest rank at the time an upstream slot selection is made.

2. The method of claim 1, comprising the further step of randomly selecting an upstream slot from any of the preset number of slots, except for the excluded highest rank slot.

3. The method of claim 1, comprising the further steps of randomly generating a priority number for each upstream slot;

generating a priority sequence order of slots based on the respective priority numbers; and determining which slot has a highest rank based on comparison of the rank of each slot taken in the priority sequence order.

4. The method of claim 3, wherein the step of randomly generating a priority number for each upstream slot is carried out based on an input seed number representing a unique physical identification number of the network terminal.

5. The method of claim 3, wherein the step of determining which slot has a highest rank includes the steps of:

initially assigning the highest rank to the first upstream slot in the priority sequence order;

comparing the rank of the first upstream slot to the rank of the second upstream slot in the priority sequence order; and re-assigning the highest rank to the second upstream slot if its rank is greater to or equal than the rank of the first upstream slot.

6. The method of claim 1, wherein the rank is an integer number, and wherein the step of compiling an ongoing rank for each respective upstream slot includes the steps of:

initially assigning a rank of zero to each upstream slot;

adding to the rank of a respective slot for each occurrence of an unsuccessful transmission in response to a respective permit; and subtracting from the rank of respective slot for each occurrence of a successful transmission by a network terminal in response to a respective permit.

7. The method of claim 6, wherein the step of compiling an ongoing rank for each respective upstream slot further includes the step of subtracting from the rank of respective slot for each occurrence that no transmission was attempted by a network terminal in response to a respective permit.

8. The method of claim 6, wherein the step of adding to the rank of respective slot is carried out by adding three to the respective rank if the rank was previously zero, and otherwise adding two to the respective rank.

9. The method of claim 6, wherein the step of subtracting from the rank of respective slot is carried out by subtracting one from the respective rank.

10. In a communication network comprising a headend and a plurality of network terminals in communication with the headend over a shared communication medium, wherein the headend periodically transmits a multi-slot upstream transmission permit to the network terminals authorizing any one of a specified group of network terminals to transmit a response to the headend in any one of a preset number of corresponding upstream slots, and wherein the headend transmits feedback information to the network terminals following each multi-slot upstream transmission permit, the feedback information containing for each respective upstream slot an indication as to whether a transmission was attempted by any network terminal in response to the respective permit and, if so, whether the transmission was successfully received by the headend, a method for a respective network terminal to transmit a response to a multi-slot upstream transmission permit, comprising the step of:

compiling an ongoing rank for each respective upstream slot based on the feedback information transmitted by the headend;

determining which upstream slot has a highest rank; and randomly selecting an upstream slot from any of the preset number of slots except that slot determined to have the highest rank.

11. The method of claim 10, wherein the step of determining which slot has a highest rank includes the steps of randomly generating a priority number for each upstream slot;

generating a priority sequence order of slots based on the respective priority numbers; and comparing the rank of each slot in the priority sequence order.

12. The method of claim 11, wherein the step of randomly generating a priority number for each upstream slot is carried out based on an input seed number representing a unique physical identification number of the network terminal.

13. The method of claim 11, wherein the step of determining which slot has a highest rank further includes the steps of:

initially assigning the highest rank to the first upstream slot in the priority sequence order;

comparing the rank of the first upstream slot to the rank of the second upstream slot in the priority sequence order; and re-assigning the highest rank to the second upstream slot if its rank is greater to or equal than the rank of the first upstream slot.

14. The method of claim 10, wherein the rank is an integer number, and wherein the step of compiling an ongoing rank for each respective upstream slot includes the steps of:

initially assigning a rank of zero to each upstream slot;

adding to the rank of a respective slot for each occurrence of an unsuccessful transmission in response to a respective permit;

subtracting from the rank of respective slot for each occurrence of a successful transmission by a network terminal in response to a respective permit; and subtracting from the rank of respective slot for each occurrence that no transmission was attempted by a network terminal in response to a respective permit.

15. The method of claim 14, wherein the step of adding to the rank of respective slot is carried out by adding three to the respective rank if the rank was previously zero, and otherwise adding two to the respective rank.

* * * * *